United States Patent
Whittle

(10) Patent No.: US 11,193,381 B2
(45) Date of Patent: Dec. 7, 2021

(54) TURBINE VANE ASSEMBLY HAVING CERAMIC MATRIX COMPOSITE COMPONENTS WITH SLIDING SUPPORT

(71) Applicant: Rolls-Royce plc, London (GB)

(72) Inventor: Michael J. Whittle, London (GB)

(73) Assignee: Rolls-Royce plc

(*) Notice: Subject to any disclaimer, the term of this patent is extended or adjusted under 35 U.S.C. 154(b) by 145 days.

(21) Appl. No.: 16/415,196

(22) Filed: May 17, 2019

(65) Prior Publication Data
US 2020/0362709 A1   Nov. 19, 2020

(51) Int. Cl.
| | |
|---|---|
| F01D 9/02 | (2006.01) |
| F01D 9/04 | (2006.01) |
| F01D 5/18 | (2006.01) |
| F01D 5/28 | (2006.01) |

(52) U.S. Cl.
CPC ............ F01D 9/02 (2013.01); F01D 5/189 (2013.01); F01D 5/284 (2013.01); F01D 9/042 (2013.01); F05D 2230/60 (2013.01)

(58) Field of Classification Search
CPC . F01D 9/02; F01D 9/042; F01D 9/041; F01D 5/284; F01D 5/147; F05D 2230/60; F05D 2230/6033
See application file for complete search history.

(56) References Cited

U.S. PATENT DOCUMENTS

| | | | | |
|---|---|---|---|---|
| 3,066,911 A | * | 12/1962 | Anderson | ............. F01D 25/246 415/138 |
| 5,630,700 A | | 5/1997 | Olsen et al. | |
| 6,164,903 A | * | 12/2000 | Kouris | ....................... F01D 9/04 415/135 |
| 6,325,593 B1 | | 12/2001 | Darkins, Jr. et al. | |
| 6,514,046 B1 | | 2/2003 | Morrison et al. | |
| 6,558,114 B1 | | 5/2003 | Tapley et al. | |
| 6,648,597 B1 | | 11/2003 | Widrig et al. | |
| 7,452,189 B2 | | 11/2008 | Shi et al. | |
| 7,722,317 B2 | * | 5/2010 | Schiavo | ............... F01D 25/246 415/138 |
| 7,762,766 B2 | | 7/2010 | Shteyman et al. | |
| 7,824,152 B2 | | 11/2010 | Morrison | |
| 8,210,803 B2 | | 7/2012 | Schaff et al. | |
| 8,251,652 B2 | * | 8/2012 | Campbell | ............... F01D 9/041 415/209.3 |

(Continued)

FOREIGN PATENT DOCUMENTS

| | | |
|---|---|---|
| EP | 3121379 A1 | 1/2017 |
| JP | 2004076601 A | 3/2004 |

OTHER PUBLICATIONS

Extended European Search Report, European Application No. 20170603.3-1004 dated Jul. 20, 2020, 4 pages.

*Primary Examiner* — Christopher Verdier
*Assistant Examiner* — Eric A Lange
(74) *Attorney, Agent, or Firm* — Barnes & Thornburg LLP

(57) ABSTRACT

A turbine vane assembly adapted for use in a gas turbine engine includes a spar, a turbine vane, and load transfer pins. The spar comprises metallic materials and is configured to support other components of the turbine vane assembly relative to an associated turbine case. The turbine vane comprises ceramic matrix composite materials and is shaped to include an airfoil configured to direct the flow of hot gasses through a primary gas path of the turbine vane assembly.

19 Claims, 8 Drawing Sheets

(56) References Cited

U.S. PATENT DOCUMENTS

| | | |
|---|---|---|
| 8,454,303 B2 | 6/2013 | Garcia-Crespo |
| 8,956,105 B2 | 2/2015 | Uskert et al. |
| 9,097,141 B2 | 8/2015 | Paradis |
| 9,335,051 B2 | 5/2016 | Jarmon et al. |
| 9,546,557 B2 | 1/2017 | Grooms, III et al. |
| 9,915,159 B2 | 3/2018 | Huizenga et al. |
| 10,174,619 B2 | 1/2019 | Uskert et al. |
| 10,174,627 B2 | 1/2019 | Chang et al. |
| 2006/0228211 A1* | 10/2006 | Vance ............... F01D 5/147 415/200 |
| 2008/0053107 A1 | 3/2008 | Weaver et al. |
| 2009/0193657 A1* | 8/2009 | Wilson, Jr. ........... F01D 5/20 29/889.721 |
| 2010/0068034 A1 | 3/2010 | Schiavo et al. |
| 2014/0234118 A1 | 8/2014 | Beaujard et al. |
| 2014/0255174 A1 | 9/2014 | Duelm et al. |
| 2016/0123163 A1 | 5/2016 | Freeman et al. |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2016/0290147 A1 | 10/2016 | Weaver |
| 2017/0022833 A1 | 1/2017 | Heitman et al. |
| 2017/0051619 A1 | 2/2017 | Tuertscher |
| 2017/0298748 A1 | 10/2017 | Vetters et al. |
| 2018/0045117 A1 | 2/2018 | Groves, II et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |

\* cited by examiner

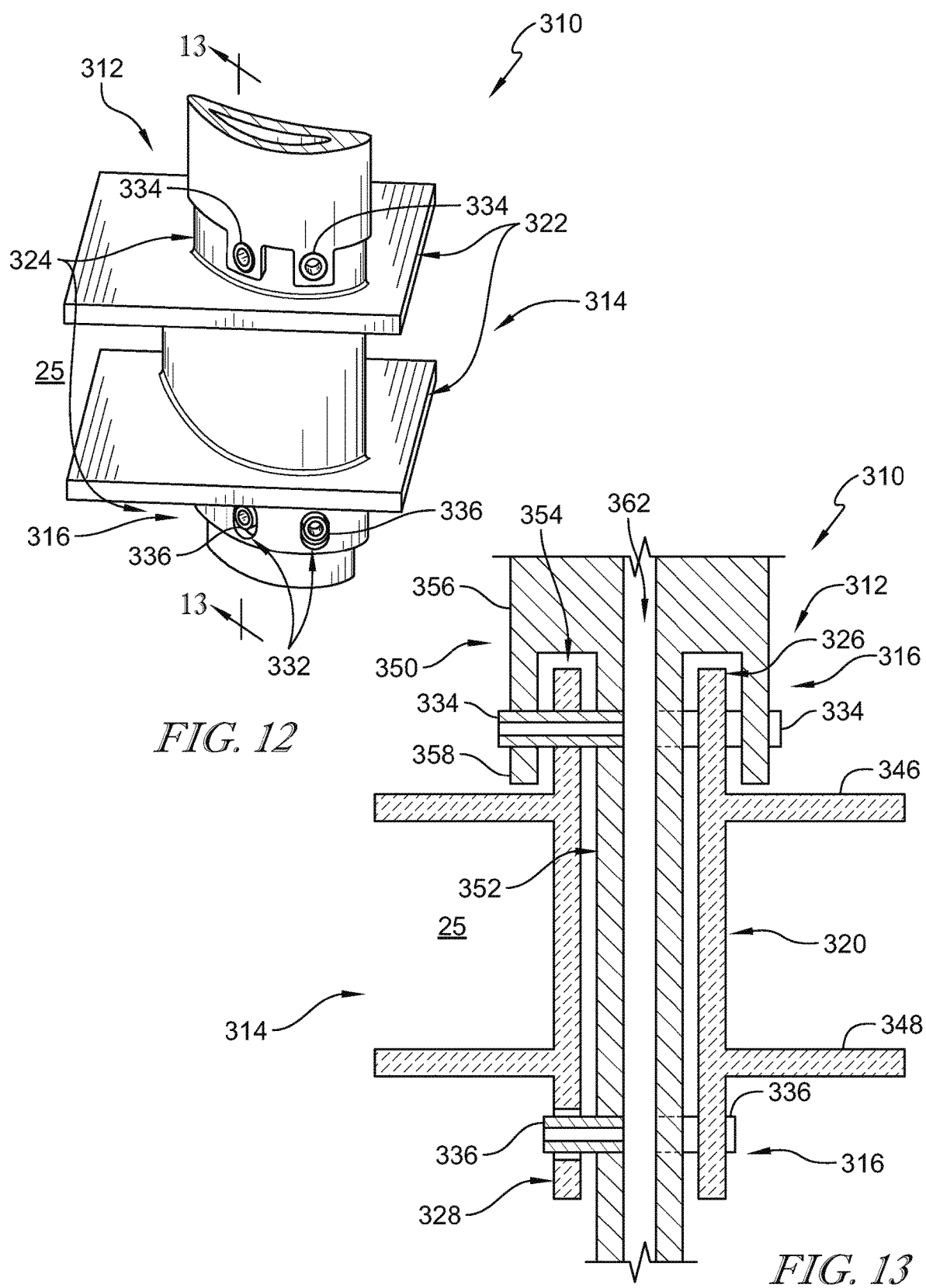

TURBINE VANE ASSEMBLY HAVING CERAMIC MATRIX COMPOSITE COMPONENTS WITH SLIDING SUPPORT

FIELD OF THE DISCLOSURE

The present disclosure relates generally to vane assemblies for gas turbine engines, and more specifically to vane assemblies that comprise ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly adapted for use in a gas turbine engine may include a metallic spar, a turbine vane, and load transfer pins. The metallic spar may extend radially inwardly relative to an associated turbine case arranged around a central reference axis. The metallic spar may be configured to support other components of the turbine vane assembly relative to the associated turbine case. The turbine vane comprising ceramic matrix composite materials may be supported by the metallic spar. The load transfer pins may couple the turbine vane to the metallic spar.

In some embodiments, the turbine vane may be shaped to include an airfoil, an outer vane mount, and an inner vane mount. The airfoil may be configured to direct the flow of hot gasses through a primary gas path of the turbine vane assembly. The outer vane mount may be arranged radially outward of the primary gas path. The inner vane mount may be arranged radially inward of the primary gas path.

In some embodiments, the turbine vane may be shaped to define a passageway extending radially therethrough. The metallic spar may extend from a radially-outer end of the turbine vane to a radially-inner end of the turbine vane.

In some embodiments, the load transfer pins may include an outer mount pin and an inner mount pin. The outer mount pin may extend away from the metallic spar and through an outer aperture in the outer vane mount of the turbine vane.

The inner mount pin may extend away from the metallic spar and through an inner aperture in the inner vane mount of the turbine vane.

In some embodiments, one of the outer aperture and the inner aperture may be sized to allow radial movement of the corresponding outer mount pin or inner mount pin. The one outer aperture or inner aperture sized to allow radial movement may create a sliding support that transfers loading of the turbine vane to the metallic spar while accounting for different amounts of thermal growth due to material mismatch of the metallic spar and the turbine vane during operation of the turbine vane assembly at various temperatures.

In some embodiments, the one of the outer aperture and the inner aperture sized to allow radial movement of the corresponding outer mount pin or inner mount pin may have an enclosed oval shape to set limits on relative radial length change of the metallic spar relative to the turbine vane. In some embodiments, the one of the outer aperture and the inner aperture sized to allow radial movement of the corresponding outer mount pin or inner mount pin may be provided by a radially open-ended slot. In some embodiments, the inner aperture may be sized to allow radial movement of the corresponding inner mount pin and the outer aperture may be sized to block radial movement of the corresponding outer mount pin so as to fix the turbine vane in place radially relative to the metallic spar at the outer mount pin.

In some embodiments, the turbine vane may be shaped to further include an outer panel and an inner panel that may each extend circumferentially from the airfoil away from the passageway through the turbine vane to define the primary gas path across the turbine vane assembly. The outer panel may be arranged radially inward of the outer vane mount. The inner panel may be arranged radially outward of the inner vane mount.

In some embodiments, the metallic spar may include a rod and a cap. The rod may extend radially through the passageway defined by the turbine vane. The cap may be shaped to define a cavity that receives one of the outer vane mount and the inner vane mount. In some embodiments, the rod and the cap included in the metallic spar may be formed from a single piece such that the metallic spar is a one-piece, integral component.

In some embodiments, at least one of the load transfer pins may extend into the cap. In some embodiments, the at least one of the load transfer pins may extend from the cap, through a side wall of one of the outer vane mount and the inner vane mount, and into the rod of the metallic spar.

In some embodiments, the metallic spar may define a cooling air duct. The cooling air duct may extend radially through the turbine vane.

In some embodiments, at least one of the load transfer pins may be hollow. The at least one load transfer pin may provide fluid communication from outside the turbine vane into the cooling air duct of the metallic spar.

According to another aspect of the present disclosure, a turbine vane assembly may include a metallic support structure, a turbine vane, and load transfer pins. The metallic support structure may be adapted to be coupled to a turbine case and may have a length that extends radially relative a central reference axis. The turbine vane may comprise ceramic matrix composite materials.

In some embodiments, the turbine vane may be shaped to include an airfoil, an outer vane mount, and an inner vane mount. The airfoil may extend radially across a primary gas path of the turbine vane assembly. The outer vane mount may be arranged radially outward of the primary gas path. The inner vane mount may be arranged radially inward of the primary gas path.

In some embodiments, the load transfer pins may include an outer mount pin and an inner mount pin. The outer mount pin may extend from the metallic support structure and into an outer aperture in the outer vane mount of the turbine vane. The inner mount pin may extend from the metallic support structure and into an inner aperture in the inner vane mount of the turbine vane. In some embodiments, one of the outer aperture and the inner aperture may be sized to allow radial movement of the corresponding outer mount pin or inner mount pin to create a sliding support.

In some embodiments, the turbine vane may be shaped to further include an outer panel and an inner panel that may each extend circumferentially from the airfoil away from the passageway through the turbine vane to define the primary gas path. The outer panel may be arranged radially inward of the outer vane mount. The inner panel may be arranged radially outward of the inner vane mount.

In some embodiments, the turbine vane may be a one-piece component. In some embodiments, the airfoil, the outer vane mount, the inner vane mount, the outer panel, and the inner panel may be integrated into a single piece of ceramic matrix composite material that has been co-infiltrated with ceramic matrix material.

In some embodiments, the metallic support structure may be provided by a spar. The spar may include a rod that and a cap. The rod may extend radially through the passageway defined by the turbine vane. The cap may be shaped to define a cavity that receives one of the outer vane mount and the inner vane mount.

In some embodiments, at least one of the load transfer pins may extend into the cap. In some embodiments, the at least one of the load transfer pins may extend from the cap, through a side wall of one of the outer vane mount and the inner vane mount, and into the rod of the metallic support structure.

According to another aspect of the present disclosure a method may comprise a number of steps. The method may include providing a spar that extends relative to an axis, a turbine vane having an outer vane mount arranged at a radially outward end of the turbine vane and an inner vane mount arranged at a radially inward end of the turbine vane, and load transfer pins including an outer pin and an inner mount pin. The method may include locating the metallic spar in a passageway that extends radially through the turbine vane, inserting the outer load transfer pin through an outer aperture formed in the outer vane mount of the turbine vane and into the metallic spar, and inserting the inner load transfer pin through an inner aperture formed in the inner vane mount of the turbine vane and into the metallic spar. In some embodiments, one of the outer aperture and the inner aperture is a slot to allow radial movement of the corresponding outer mount pin or inner mount pin.

These and other features of the present disclosure will become more apparent from the following description of the illustrative embodiments.

BRIEF DESCRIPTION OF THE DRAWINGS

FIG. 12 is another embodiment of a turbine vane assembly adapted for use in the gas turbine engine showing the turbine vane assembly includes a metallic spar, a turbine vane supported by the metallic spar, and load transfer pins that couple the turbine vane to the spar and extend through vane mounts of the turbine vane at both radially inner and outer ends of the vane and into a cap integrally formed with a rod of the spar;

FIG. 13 is a section view of the turbine vane assembly of FIG. 12 taken along line 13-13 showing the spar includes the rod and the cap that are integrally formed as a one-piece component.

DETAILED DESCRIPTION OF THE DRAWINGS

Figure 1:
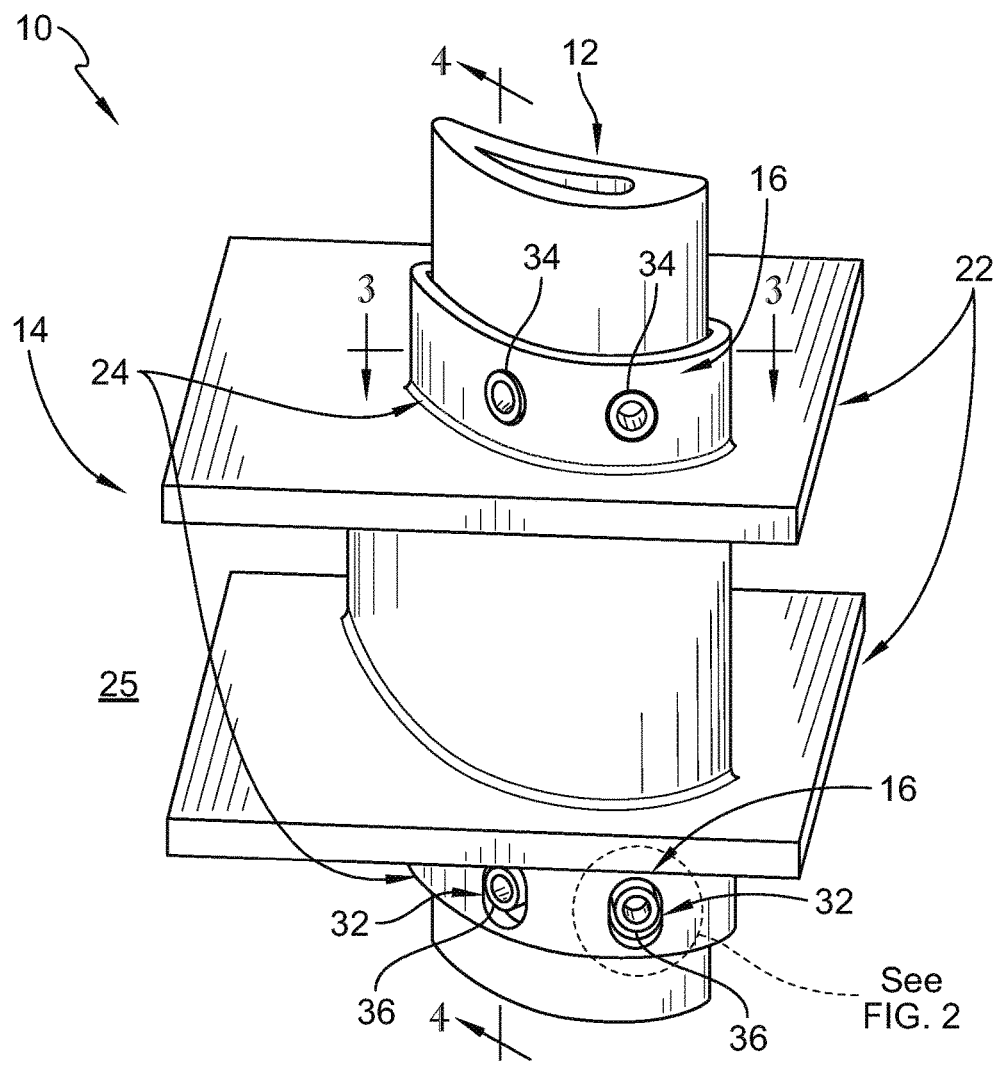
FIG. 1 is a perspective view of a turbine vane assembly adapted for use in a gas turbine engine showing the turbine vane assembly includes a metallic spar, a turbine vane supported by the metallic spar, and load transfer pins that couple the turbine vane to the spar and extend through vane mounts of the turbine vane at both radially inner and outer ends of the vane to transfer loads from the vane to the spar.

For the purposes of promoting an understanding of the principles of the disclosure, reference will now be made to a number of illustrative embodiments illustrated in the drawings and specific language will be used to describe the same.

A turbine vane assembly 10 according to the present disclosure is adapted for use in a gas turbine engine as shown in FIGS. 1-5. The turbine vane assembly includes a spar 12, a turbine vane 14, and load transfer pins 16 as shown in FIG. 1. The spar 12 extends radially inwardly relative to an associated turbine case arranged around a central reference axis. The turbine vane 14 is shaped to define a passageway 18 extending radially therethrough and is supported by the metallic spar 12 that extends through the passageway 18. The load transfer pins 16 couple the turbine vane 14 to the metallic spar 12. In other embodiments, the load transfer pins 16 may also be used to couple the turbine vane 14 to other types of metallic support structures (inner collars, turbine case, flanges, etc.).

The spar 12 comprises metallic materials while the turbine vane 14 comprises ceramic matrix composite materials. The ceramic matrix composite vane 14 is adapted to withstand high temperatures, but may have a relatively low strength compared the metallic spar 12. The spar 12 is therefore configured to support other components of the turbine vane assembly 10, like the ceramic matrix composite turbine vane 14, relative to the associated turbine case and carry any aerodynamic loads from the turbine vane 14.

Metallic materials of the spar 12 and ceramic matrix composite materials of the turbine vane 14 grow and shrink at different rates when exposed to high/low temperatures. More specifically, metallic materials have coefficients of thermal expansion much higher than those of ceramic matrix composites. To accommodate this difference, the turbine vane 14 is shaped to allow radial movement (sliding) of the corresponding load transfer pins 16 that couple the turbine vane 14 to the spar 12 during operation of the turbine vane assembly 10 at various temperatures.

Figure 4:
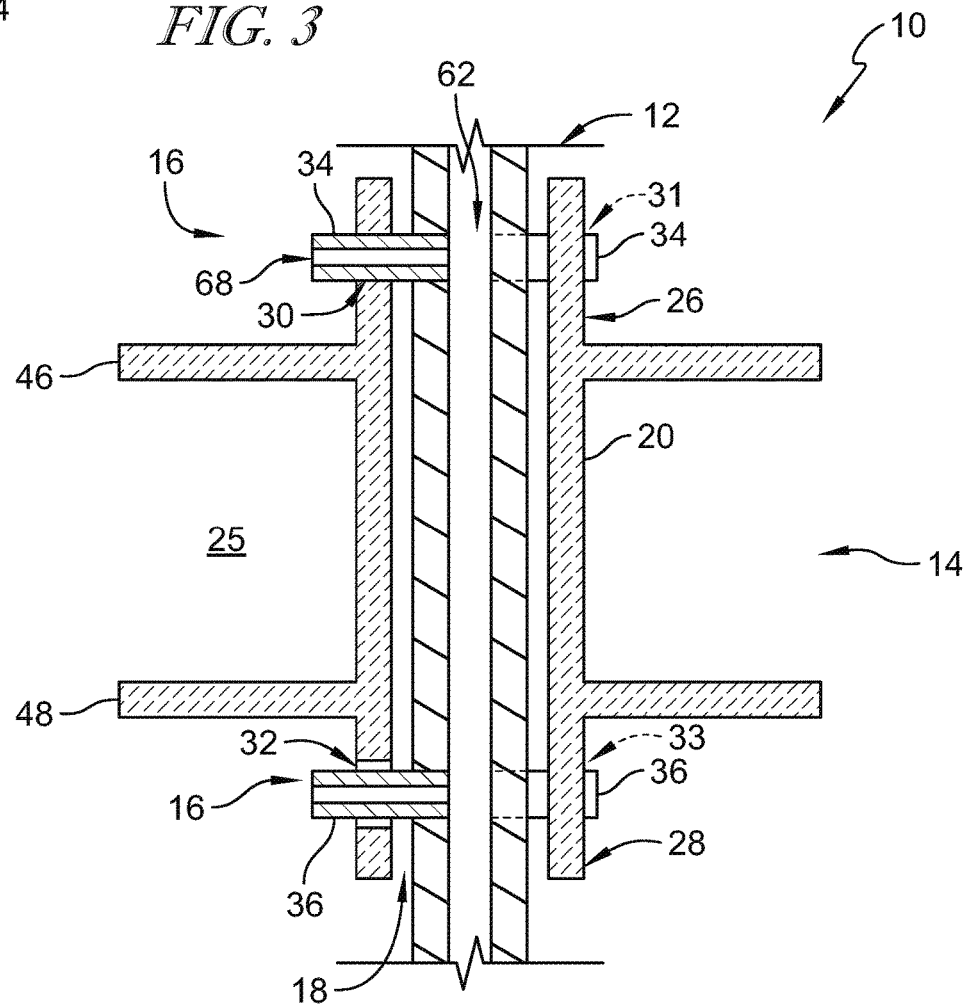
FIG. 4 is a section view of the turbine vane assembly of FIG. 1 taken along line 4-4 showing the load transfer pins include outer mount pins arranged at the outer vane mount of the turbine vane and inner mount pins arranged at the inner vane mount of the turbine vane, and showing the spar includes a cooling air duct that extends radially through the spar and that is in fluid communication with the load transfer pins.

The turbine vane 14 includes an airfoil 20, panels 22, and vane mounts 24 as shown in FIGS. 1 and 4. The airfoil 20 is configured to direct the flow of hot gasses through a primary gas path 25 of the turbine vane assembly 10. The panels 22 each extend circumferentially from the airfoil 20 away from the passageway 18 through the turbine vane 14 to define the primary gas path 25 across the turbine vane assembly 10. The vane mounts 24 are each arranged radially outward/inward of the primary gas path 25.

The vane mounts 24 include an outer vane mount 26 and an inner vane mount 28 as shown in FIG. 4. The outer vane mount 26 is arranged radially outward of the primary gas path 25 and the inner vane mount 28 is arranged radially inward of the primary gas path 25.

Each of the vane mounts 26, 28 includes apertures 30, 32 that receive the load transfer pins 16 as shown in FIGS. 1-2 and 4-5. The outer vane mount 26 includes outer apertures 30 and the inner vane mount 28 includes inner apertures 32. In the illustrative embodiments, one of the outer apertures 30 and the inner apertures 32 are sized to allow radial movement of the corresponding load transfer pins 16 to create the sliding support that transfers loading of the turbine vane 14 to the metallic spar 12 while accounting for materials mismatch of the metallic spar 12 and the turbine vane 14 during operation of the turbine vane assembly 10 at various temperatures.

The load transfer pins 16 include outer mount pins 34 and inner mount pins 36 as shown in FIGS. 1-5. The outer mount pin 34 extends away from the spar 12 and through the outer aperture 30 in the outer vane mount 26 of the turbine vane 14. The inner mount pin 36 that extends away from the spar 12 and through the inner aperture 32 in the inner vane mount 28 of the turbine vane 14.

In the illustrative embodiment, the inner apertures 32 are sized to allow radial movement of the corresponding inner mount pins 36 to create the sliding support. The outer apertures 30 are sized to block radial movement of the corresponding outer mount pins 34 so as to fix the turbine vane 14 in place radially relative to the metallic spar 12 at the outer mount pins 34. In other embodiments, the outer apertures 30 may be sized to allow radial movement of the corresponding outer mount pins 34 for compliance.

Figure 2:
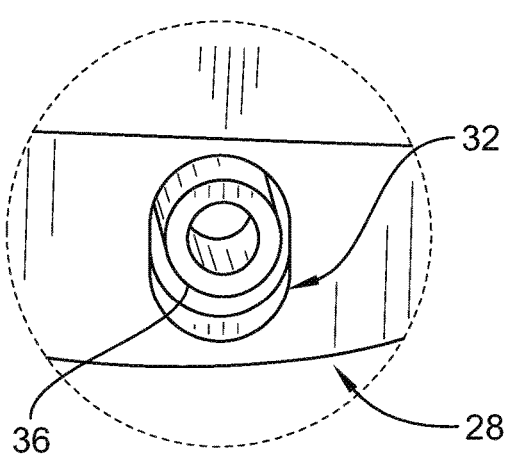
FIG. 2 is a detail view of the turbine vane assembly of FIG. 1 showing the inner vane mount of the turbine vane includes inner apertures that are sized to allow radial movement of the corresponding inner mount pin enclosed in the oval shape of the inner aperture caused by the materials mismatch between the spar and the turbine vane.

In the illustrative embodiment of FIG. 2, each of the inner apertures 32 sized to allow radial movement of the corresponding inner mount pins 36 has an enclosed oval shape. The enclosed oval shape sets limits on relative radial length change of the metallic spar 12 relative to the turbine vane 14. In the illustrative embodiment of FIG. 2A, each of the inner apertures 32 sized to allow radial movement of the corresponding inner mount pins 36 is provided by a radially open-ended slot 32.

Figure 3:
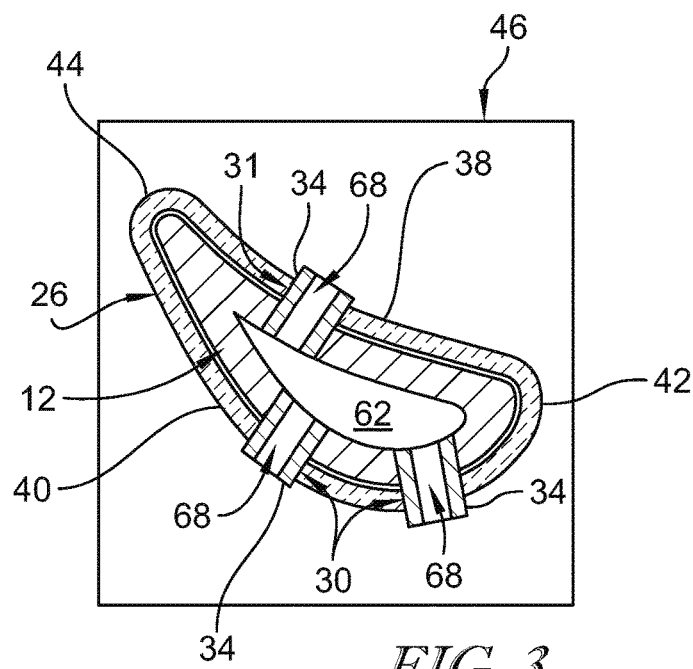
FIG. 3 is a sectional view of the turbine vane assembly of FIG. 1 taken along line 3-3 showing the load transfer pins extend away from the spar on both pressure and suction sides of the turbine vane through outer apertures formed in an outer vane mount included in the turbine vane.

The vane mounts 24 are also shaped to include a pressure side wall 38, a suction side wall 40, a leading edge 42, and a trailing edge 44 as shown in FIG. 3. The suction side 40 wall is spaced apart circumferentially from the pressure side wall 38. The pressure side 38 wall and the suction side wall 40 extend axially between and interconnect the leading edge 42 and the trailing edge 44.

In some embodiments, the apertures 30, 32 may instead by blind features or blind holes. The blind holes may extend into the side walls 38, 40 of the outer and inner vane mounts 26, 28, so that the pins 16 may engage the blind feature and the side walls 38, 40, not just the side walls 38, 40 of the vane mounts 26, 28.

In the illustrative embodiments, the outer apertures 30 and the inner apertures 32 extend through one of the pressure side wall 38 and the suction side wall 40 and open into the passageway 18. Each of the load transfer pins 16 extend through one of the pressure side wall 38 and suction side wall 40 of one of the outer vane mount 26 and the inner vane mount 28 and into the spar 12.

In the illustrative embodiment, the outer vane mount 26 includes suction side apertures 30 and a pressure side aperture 31 as shown in FIGS. 3 and 4. The suction side apertures 30 extend through the suction side wall 40 of the outer vane mount 26. The pressure side aperture 31 extends through the pressure side wall 38 of the outer vane mount 26.

In the illustrative embodiment, the outer vane mount 26 includes suction side apertures 32 and a pressure side aperture 33 as suggested in FIG. 4 The suction side apertures 32 extend through the suction side wall 40 of the inner vane mount 28. The pressure side aperture 33 extends through the pressure side wall 38 of the inner vane mount 28.

In the illustrative embodiment, the outer vane mount 26 and the inner vane mount 28 each include only three apertures 30, 32. In other embodiments, the mounts 26, 28 may each include more than three apertures 30, 32. In other embodiments, the outer vane mount 26 may include a different number of apertures 30 than the inner vane mount 28 and vice versa.

Figure 5:
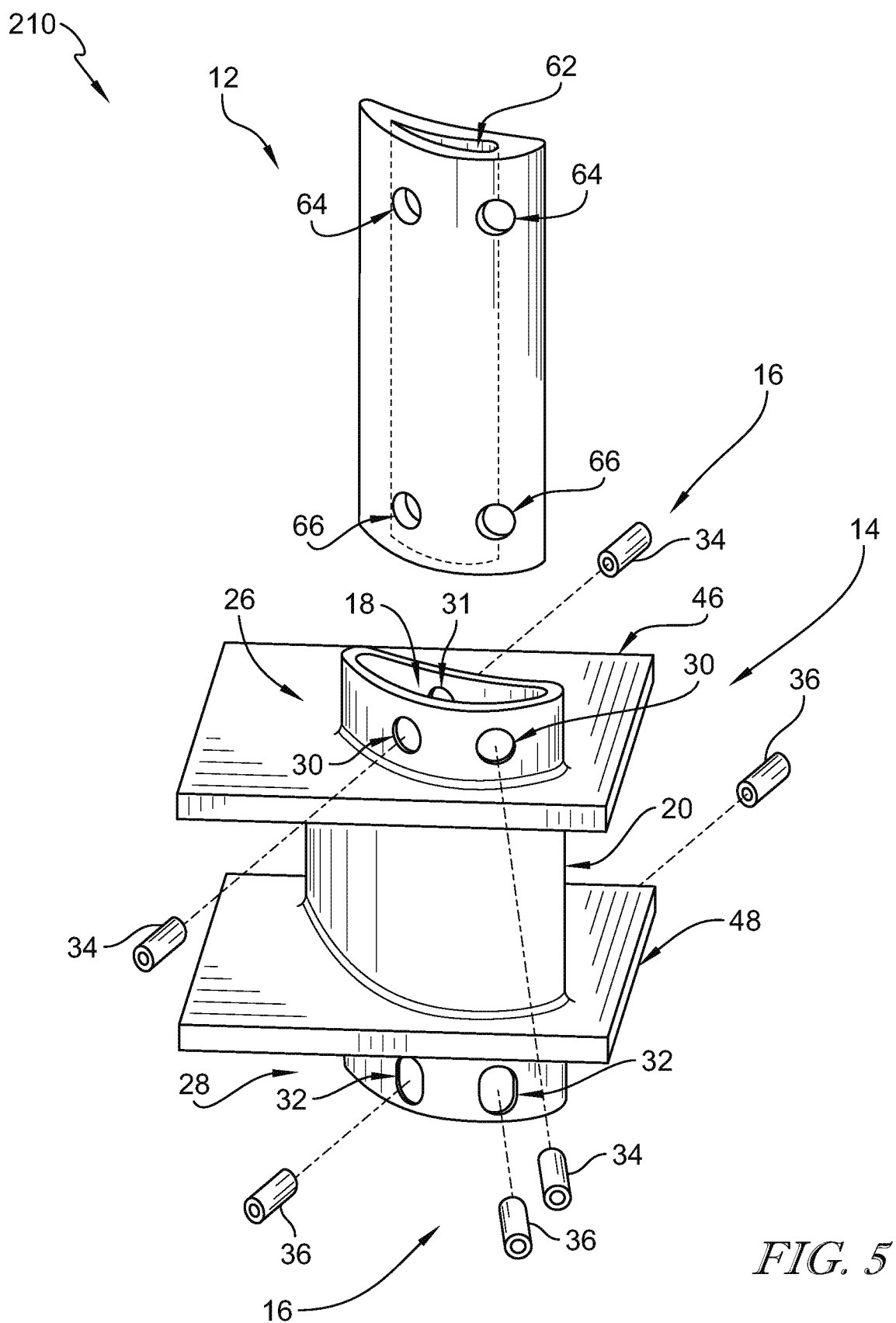
FIG. 5 is an exploded view of the turbine vane assembly of FIG. 1 showing the spar includes inner and outer apertures that are configured to interference fit with the outer and inner mount pins.

The panels 22 include an outer panel 46 and an inner panel 48 as shown in FIGS. 4 and 5. Each of the panels 46, 48 extends circumferentially from the airfoil 20 away from the passageway 18 through the turbine vane 14 to define the primary gas path 25 across the turbine vane assembly 10. The outer panel 46 is arranged radially inward of the outer vane mount 26 and the inner panel 48 is arranged radially outward of the inner vane mount 28.

In the illustrative embodiment, the turbine vane 14 is a one-piece component. The airfoil 20, the outer vane mount 26, the inner vane mount 28, the outer panel 46, and the inner panel 48 are integrated into a single piece of ceramic matrix composite material that has been co-infiltrated with ceramic matrix material. In other embodiments, the airfoil 20, the panels 22, and the vane mounts 24 are formed as separate components.

Turning again to the spar 12, the spar 12 is shaped to include a cooling air duct 62, outer pin receivers 64, and inner pin receivers 66 as shown in FIG. 5. The cooling air duct 62 extends radially through the spar 12. Each of the outer pin receivers 64 extend through the spar 12 at a radially outer end of the spar 12 and open into the air duct 62. Each of the inner pin receivers 66 extend through the spar 12 at a radially inner end of the spar 12 and open into the air duct 62. In other embodiments, the pin receivers 64, 66 may only extend partway into the spar 12.

In the illustrative embodiment, the spar 12 is arranged to extend radially through the passageway 18 of the vane 14 such that the outer and inner pin receivers 64, 66 align with the outer and inner apertures 30, 32 of the vane mounts 26, 28 as shown in FIG. 4. Each of the outer mount pins 34 extends through the outer aperture 30 of the outer vane mount 26 and into the outer pin receiver 64 of the spar 12. Each of the inner mount pins 36 extends through the inner aperture 32 of the inner vane mount 28 and into the inner pin receiver 66 of the spar 12.

In the illustrative embodiment, the outer and inner pin receivers 64, 66 are sized to receive the outer and inner mount pins 34, 36 so as to fix the pins 16 in place and couple the pins 16 to the metallic spar 12. The outer mount pins 34 extend into the outer pin receiver 64 and inner pins 36 extend into the inner pin receivers 66 of the spar 12 to couple to the spar 12.

It is also contemplated that the spar 12 may be omitted and that other metallic support structures may be used to couple the turbine vane 14 to the turbine case. In some embodiments where the spar is omitted, a collar support arrangement may be used to couple the turbine vane 14 to the turbine case. The load transfer pins 16 may extend through that collar support arrangement and engage the turbine vane mounts 26, 28 of the turbine vane 14 to couple the vane 14 to the case and transfer the loads applied to the vane 14 to the turbine case. In other embodiments, an inner load transfer collar may be used to transmit forces at the radially inner load transfer pins 36. The inner load transfer collar may be attached to the spar 12 or may be supported by interspersed metallic vanes.

In the illustrative embodiment, the load transfer pins 16 are made from metallic materials and are mechanically fastened or joined to the metallic spar 12. In other embodiments, the load transfer pins 16 may be made of non-metallic materials to better match the ceramic matrix composite materials coefficient of thermal expansion and improve chemically compatibility.

Each of the load transfer pins 16 includes a through hole 68 as shown in FIGS. 3 and 4. The through hole 68 extends through the length of the pin 16. In the illustrative embodiment, the through hole 68 opens into the passageway 18 of the vane 14.

In some embodiments, the through holes 68 may be used to supply cooling air to the cooling air duct 62 of the spar 12 and transit flow to feed other cavities with the cooling air. In other embodiments, the through holes 68 of the pins 16 may be used to cool the pins 16 and reduce the temperature of the contact between the ceramic vane 14 and the load transfer pins 16. In some embodiments, the spar 12 may be also be formed to include one or more cooling air impingement holes to allow cooling air from a secondary air system to flow through the spar 12 and cool the ceramic matrix composite material of the vane 14.

In the illustrative embodiments, the load transfer pins 16 are circular is shape when viewed in cross-section. In other embodiments, the pins 16 may be another suitable shape, such as ovular.

In some embodiments, some of the load transfer pins 16 may have a smaller diameter than the other load transfer pins 16. The larger diameter pins 16 may be configured to datum the vane 14 and engage the apertures 30, 32 upon assembly. The smaller diameter pins 16 may be configured to transfer the loading and engage upon loading of the vane 14 during use of the assembly 10.

Another embodiment of a turbine vane assembly 210 in accordance with the present disclosure is shown in FIGS. 6-11. The turbine vane assembly 210 is substantially similar to the turbine vane assembly 10 shown in FIGS. 1-5 and described herein. Accordingly, similar reference numbers in the 200 series indicate features that are common between the turbine vane assembly 10 and the turbine vane assembly 210. The description of the turbine vane assembly 10 is incorporated by reference to apply to the turbine vane assembly 210, except in instances when it conflicts with the specific description and the drawings of the turbine vane assembly 210.

Figure 6:
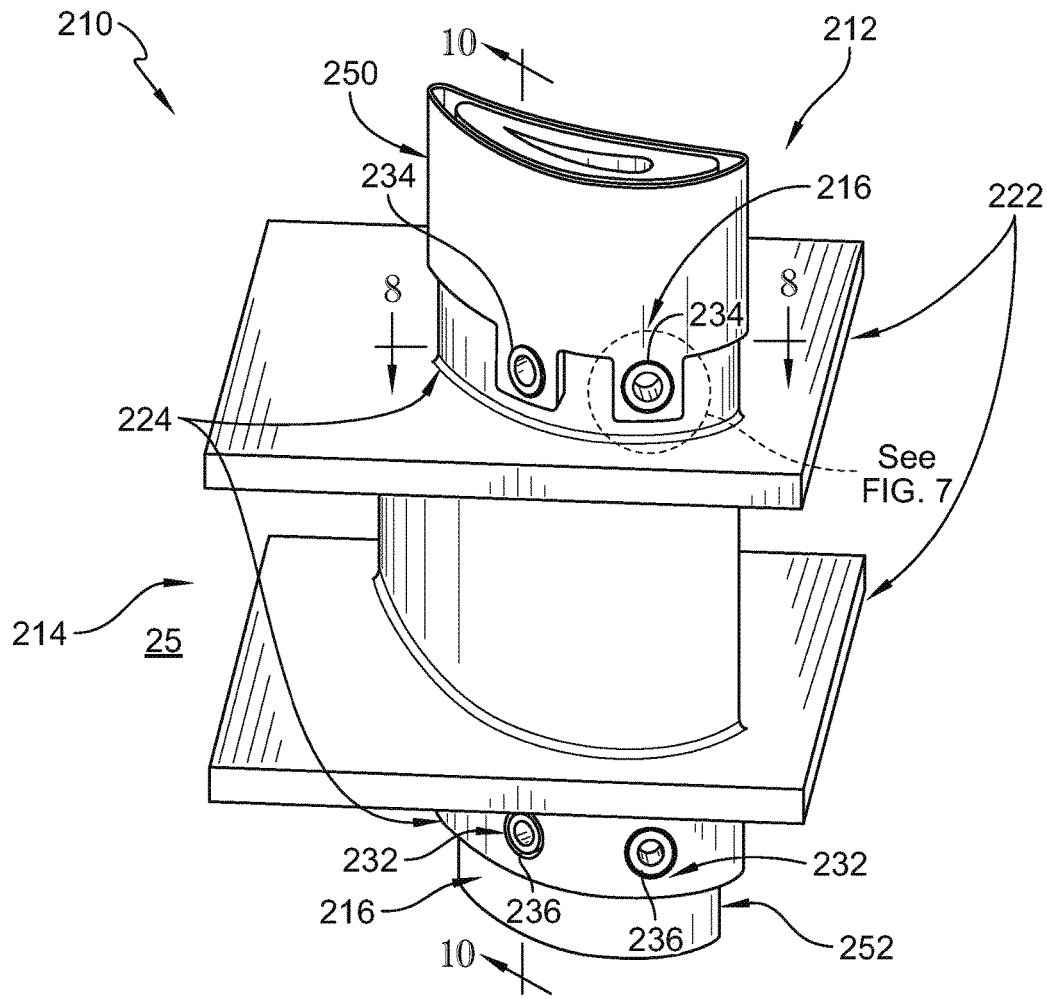
FIG. 6 is another embodiment of a turbine vane assembly adapted for use in the gas turbine engine showing the turbine vane assembly includes a metallic spar, a turbine vane supported by the metallic spar, and load transfer pins that couple the turbine vane to the spar and extend through vane mounts of the turbine vane at both radially inner and outer ends of the vane and into a cap of the spar.

The turbine vane assembly 210 includes a spar 212, a turbine vane 214, and load transfer pins 216 as shown in FIG. 6. The spar 212 extends radially inwardly relative to the turbine case. The turbine vane 214 is shaped to define a passageway 218 extending radially therethrough and is supported by the metallic spar 212 that extends through the passageway 218. The load transfer pins 216 couple the turbine vane 214 to the metallic spar 212.

The turbine vane 214 includes an airfoil 220, panels 222, and vane mounts 224 as shown in FIG. 6. The airfoil 220 is configured to direct the flow of hot gasses through a primary gas path 25 of the turbine vane assembly 210. The panels 222 each extend circumferentially from the airfoil 220 away from the passageway 218 through the turbine vane 214 to define the primary gas path 25 across the turbine vane assembly 210. The vane mounts 224 are each arranged radially outward/inward of the primary gas path 25.

Figure 10:
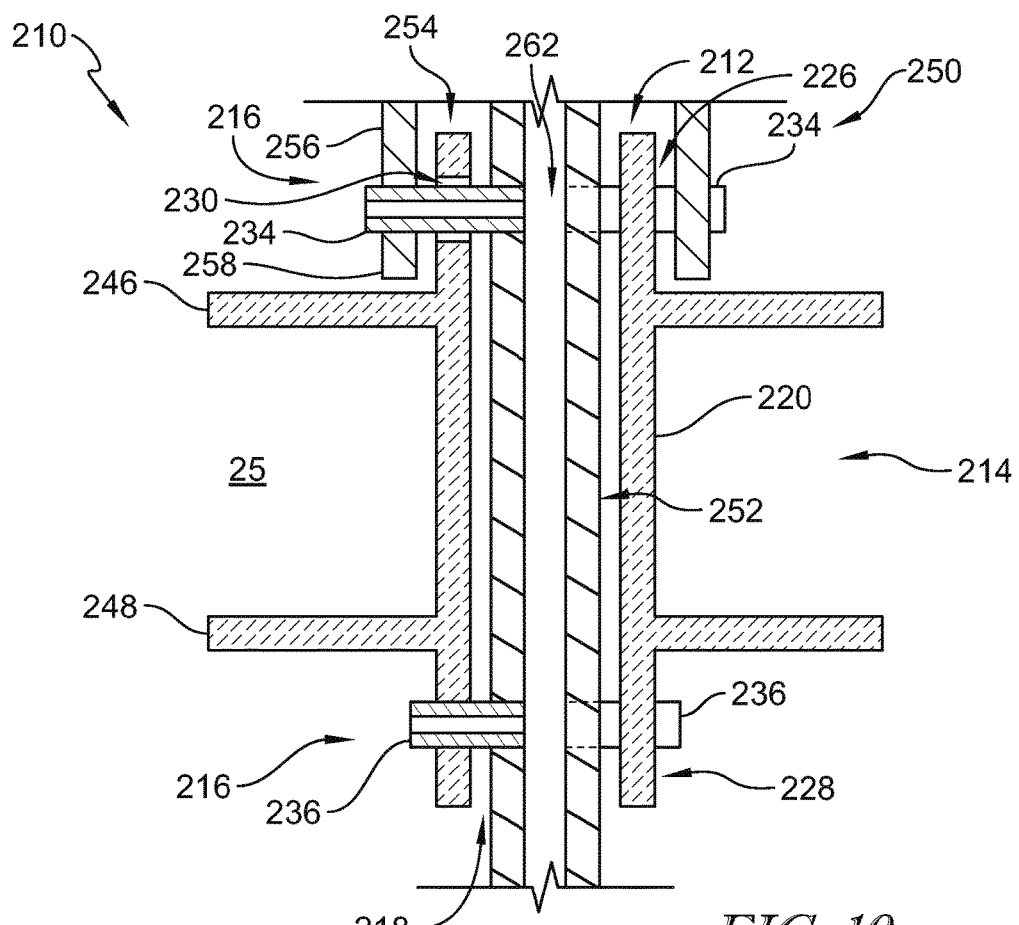
FIG. 10 is a section view of the turbine vane assembly of FIG. 6 taken along line 10-10 showing the spar includes the cap that extends over the outer vane mount of the turbine vane and a rod that extends from the cap radially through the turbine vane and is shaped to include a cooling air duct that extends radially through the spar.

The vane mounts 224 include an outer vane mount 226 and an inner vane mount 228 as shown in FIG. 10. The outer vane mount 226 is arranged radially outward of the primary gas path 25 and the inner vane mount 228 is arranged radially inward of the primary gas path 25.

Figure 7:
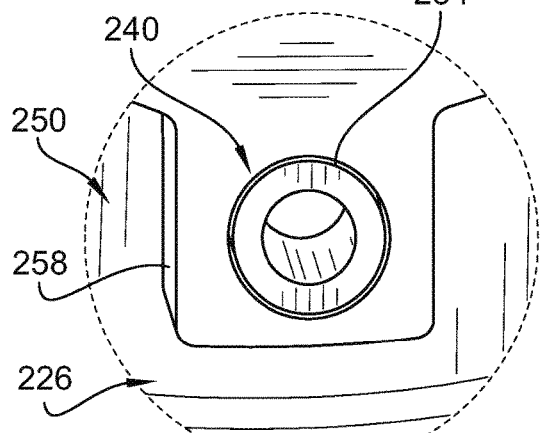
FIG. 7 is a detail view of the turbine vane assembly of FIG. 6 showing the cap of the spar includes an outer aperture that is sized to receive the corresponding outer mount pin.
Figure 11:
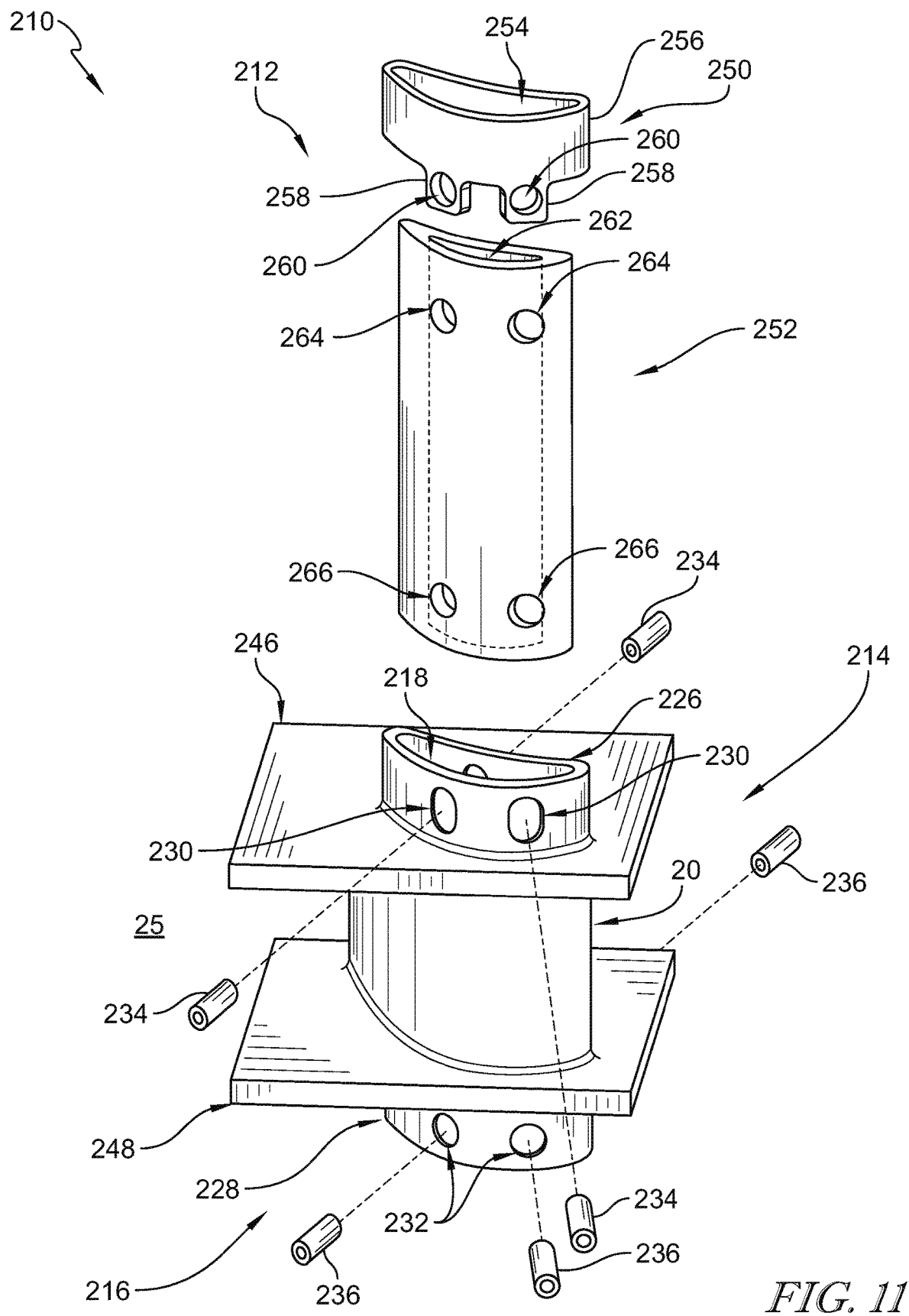
FIG. 11 is an exploded view of the turbine vane assembly of FIG. 6 showing the rod of the spar includes inner and outer apertures that are configured to interference fit with the load transfer pins.

Each of the vane mounts 226, 228 includes apertures 230, 232 that receive the load transfer pins 216 as shown in FIGS. 7 and 11. The outer vane mount 226 includes outer apertures 230 and the inner vane mount 228 includes inner apertures 232. In the illustrative embodiments, one of the outer apertures 230 and the inner apertures 232 are sized to allow radial movement of the corresponding load transfer pins 216 to create the sliding support that transfers loading of the turbine vane 214 to the metallic spar 212 while accounting for materials mismatch of the metallic spar 212 and the turbine vane 214 during operation of the turbine vane assembly 210 at various temperatures.

In the illustrative embodiment, the outer apertures 230 are sized to allow radial movement of the corresponding outer mount pins 234 to create the sliding support. The inner apertures 232 are sized to block radial movement of the corresponding inner mount pins 236 so as to fix the turbine vane 214 in place radially relative to the metallic spar 212 at the inner mount pins 236.

Figures 8, 9:
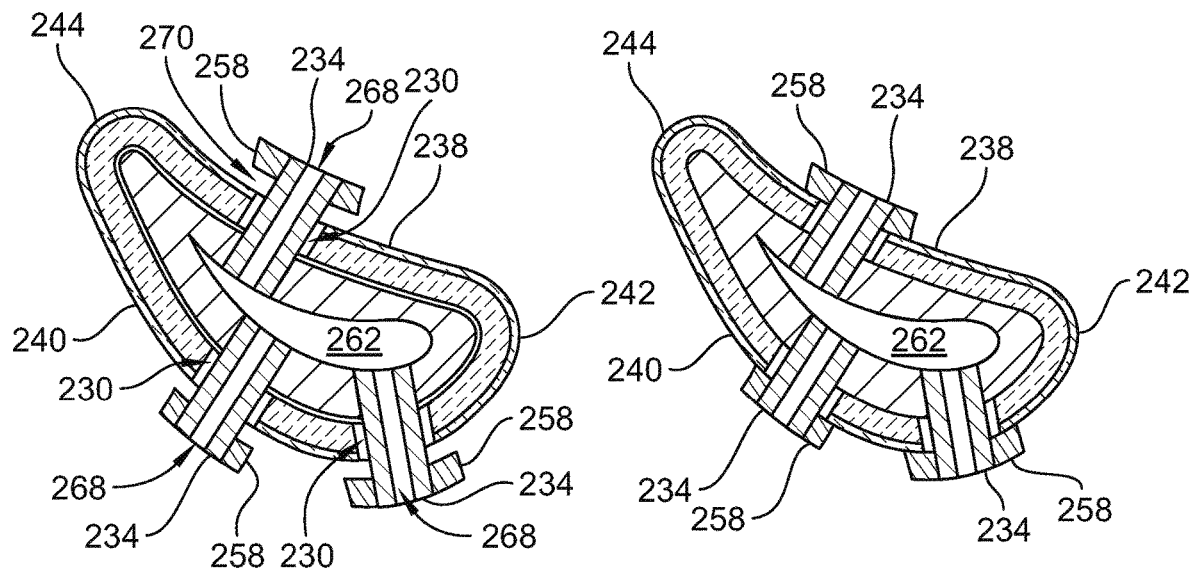
FIG. 8 is a section view of the turbine vane assembly of FIG. 6 taken along line 8-8 showing the turbine vane assembly before the use of the gas turbine engine with the cap spaced apart from the outer vane mount to form a gap, and showing that the load transfer pins extend away from the spar on both pressure and suction sides of the turbine vane through outer apertures included in the turbine vane and into the outer apertures formed in the cap.
FIG. 9 is another section view of the turbine vane assembly of FIG. 8 showing that the turbine vane assembly during use of the gas turbine engine, and showing that the components comprising metallic materials expanded eliminating the gap between the metallic components and the turbine vane due to the thermal mismatch between the ceramic matrix composite materials of the vane and the metallic materials of the spar.

The vane mounts 224 are also shaped to include a pressure side wall 238, a suction side wall 240, a leading edge 242, and a trailing edge 244 as shown in FIGS. 8 and 9. The suction side wall 240 is spaced apart circumferentially from the pressure side wall 238. The pressure side 238 wall and the suction side wall 240 extend axially between and interconnect the leading edge 242 and the trailing edge 244.

In the illustrative embodiments, the outer apertures 230 and the inner apertures 232 extend through one of the pressure side wall 238 and the suction side wall 240 and open into the passageway 218. The load transfer pins 216 extend through one of the pressure side wall 238 and suction side wall 240 of one of the outer vane mount 226 and the inner vane mount 228 and into the spar 212.

The panels 222 include an outer panel 246 and an inner panel 248 as shown in FIGS. 10 and 11. Each of the panels 246, 248 extends circumferentially from the airfoil 220 away from the passageway 218 through the turbine vane 214 to define the primary gas path 25 across the turbine vane assembly 210. The outer panel 246 is arranged radially inward of the outer vane mount 226 and the inner panel 248 is arranged radially outward of the inner vane mount 228.

The spar 212 includes a cap 250 and a rod 252 as shown in FIGS. 6, 10, and 11. The rod 252 extends radially through the passageway 218 defined by the turbine vane 214. The cap 250 is shaped to define a cavity 254 that receives one of the outer vane mount 226 and the inner vane mount 228 the turbine vane 214. In some embodiments, the cap 250 may be coupled to the turbine case to transmit the loads out to the casing. In other embodiments, the cap 250 may be coupled to another intermediate support structure or metallic carrier.

The cap 250 includes a collar 256 and tabs 258 as shown in FIGS. 10 and 11. The collar 256 extends around extends around one of the outer vane mount 226 and the inner vane mount 228. In the illustrative embodiment, the collar 256 extends around the outer vane mount 226. The tabs 258 extend radially inward from the collar 256 toward the outer panel 246 to define the cavity 254 therebetween.

The cavity 254 is configured to receive one of the outer vane mount 226 and the inner vane mount 228. In the illustrative embodiment, the cavity 254 receives the outer vane mount 226.

Figure 7A:
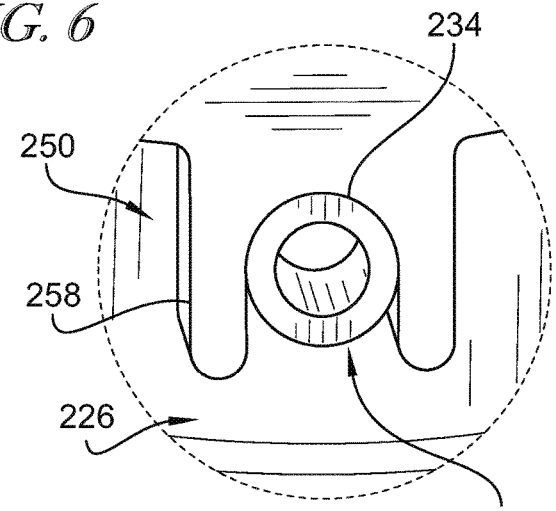
FIG. 7A is another detail view of the turbine vane assembly of FIG. 6 showing the cap of the spar includes an outer aperture provided by radially open-ended slot that allow radial movement of the corresponding outer mount pin extending into the outer aperture caused by the materials mismatch between the spar and the turbine vane.

In the illustrative embodiment, the tabs 258 are shaped to include cap pin-receiver holes 260 as shown in FIGS. 7, 7A, and 11. The cap pin-receiver holes 260 may extend through the tabs 258 and have a circular shape the same as the load transfer pins 216 like as shown in FIG. 7. In other embodiments, the cap pin-receiver holes 260 may be provided by a radially open-ended slot 260 like as shown in FIG. 7A.

The rod 252 is shaped to include a cooling air duct 262, outer pin receivers 264, and inner pin receivers 266 as shown in FIG. 6. The cooling air duct 262 extends radially through the spar 212. The outer pin receivers 264 extend through the rod 252 at a radially outer end of the rod 252 and open into the air duct 262. The inner pin receivers 266 extend through the rod 252 at a radially inner end of the rod 252 and open into the air duct 262.

In the illustrative embodiment, the rod 252 of the spar 212 is arranged to extend radially through the passageway 218 of the vane 214 such that the outer and inner pin receivers 264, 266 align with the outer and inner apertures 230, 232 of the vane mounts 226, 228 and the cap pin-receivers 260 of the cap 250 as shown in FIGS. 8-10. The corresponding load transfer pins 216 extend from the cap 250 at the cap pin-receiver holes 260, through the outer apertures 230 of the outer vane mount 226, and into the outer pin receivers 264 of the spar 212. The inner mount pins 236 extend through the inner apertures 232 of the inner vane mount 228 and into the inner pin receivers 266 of the spar 212.

At cold build, the cap 250 of the spar 212 extends around the outer vane mount 226 of the vane 214 received in the cavity 254 such that a gap 270 is formed between the outer vane mount 226 and the cap 250 like as shown in FIG. 8. During use of the turbine vane assembly 210 in the gas turbine engine, the gap 270 between the cap 250 and the outer vane mount 226 is minimized or eliminated as the metallic components of the spar 212 and the pins 216 expand reducing the gap 270 between the cap 250 and the mount 226.

In the illustrative embodiment, during use the engine with the gap 270 reduced, the tabs 258 of the cap 250 may contact the outer vane mount 226 of the vane 214 like as shown in FIG. 9. As such, the aerodynamic loads from the vane 214 may be transmitted through the tabs 258 of the cap 250 to the spar 212 rather than the pins 216.

The load transfer pins 216 include outer mount pins 234 and inner mount pins 236 as shown in FIGS. 6-11. Each of the outer mount pin 234 extends away from the cap 250 of the spar 212, through the outer aperture 230 in the side wall 238, 240 of the outer vane mount 226 of the turbine vane 214, and into the rod 252 of the spar 212. The inner mount pin 236 that extends away from the cap of the spar 212, through the inner aperture 232 in the side wall 238, 240 of the inner vane mount 228 of the turbine vane 214, and into the rod of the spar 212.

Figure 14:
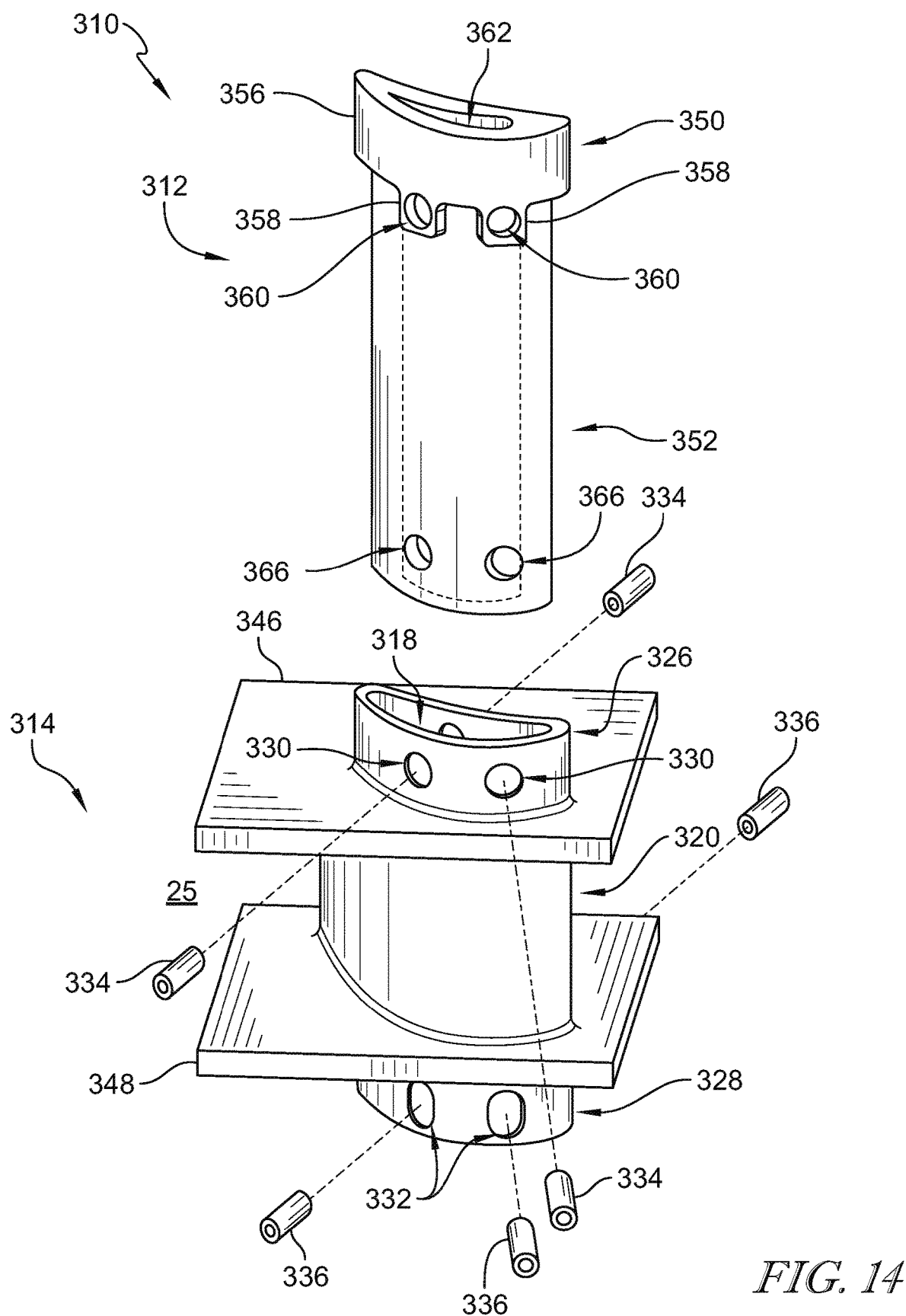
FIG. 14 is an exploded view of the turbine vane assembly of FIG. 12 showing the load transfer pins extend through apertures at both inner and outer vane mounts of the turbine vane.

Another embodiment of a turbine vane assembly 310 in accordance with the present disclosure is shown in FIGS. 12-14. The turbine vane assembly 310 is substantially similar to the turbine vane assembly 10 shown in FIGS. 1-5 and described herein. Accordingly, similar reference numbers in the 310 series indicate features that are common between the turbine vane assembly 10 and the turbine vane assembly 310. The description of the turbine vane assembly 10 is incorporated by reference to apply to the turbine vane assembly 310, except in instances when it conflicts with the specific description and the drawings of the turbine vane assembly 310.

The turbine vane assembly 310 includes a spar 312, a turbine vane 314, and load transfer pins 316 as shown in FIG. 12. The spar 312 extends radially inwardly relative to the turbine case. The turbine vane 314 is shaped to define a passageway 318 extending radially therethrough and is supported by the metallic spar 312 that extends through the passageway 318. The load transfer pins 316 couple the turbine vane 314 to the metallic spar 312.

The turbine vane 314 includes an airfoil 320, panels 322, and vane mounts 324 as shown in FIG. 12. The airfoil 320 is configured to direct the flow of hot gasses through a primary gas path 25 of the turbine vane assembly 310. The panels 322 each extend circumferentially from the airfoil 320 away from the passageway 318 through the turbine vane 314 to define the primary gas path 25 across the turbine vane assembly 310. The vane mounts 324 are each arranged radially outward/inward of the primary gas path 25.

The vane mounts 324 include an outer vane mount 326 and an inner vane mount 328 as shown in FIGS. 13 and 14. The outer vane mount 326 is arranged radially outward of the primary gas path 25 and the inner vane mount 328 is arranged radially inward of the primary gas path 25.

The spar 312 includes a cap 350 and a rod 352 as shown in FIG. 12. The rod 352 extends radially through the passageway 318 defined by the turbine vane 314. The cap 350 is shaped to define a cavity 354 that receives a portion of the turbine vane 314. In the illustrative embodiment, the rod 352 and the cap 350 included in the spar 312 are formed from a single piece such that the spar 312 is a one-piece, integral component.

The cap 350 includes a collar 356 and tabs 358 as shown in FIGS. 13 and 14. The collar 356 extends around extends around one of the outer vane mount 326 and the inner vane mount 328. In the illustrative embodiment, the collar 356 extends around the outer vane mount 326. The tabs 358 extend radially inward from the collar 356 toward the outer panel 346 to define the cavity 354 therebetween. The cavity 354 is configured to receive one of the outer vane mount 326 and the inner vane mount 328. In the illustrative embodiment, the cavity 354 receives the outer vane mount 326.

In the illustrative embodiment, the outer vane mount 326 is received in the cavity 354 of the cap 350. The tabs 358 extend radially inward and around the outer vane mount 326. In other embodiments, the cap 350 may include a single tab 358 that extends complete around the outer vane mount 326.

In the illustrative embodiment, the tabs 358 are shaped to include cap pin-receiver holes 360 as shown in FIG. 14. The cap pin-receiver holes 360 may extend through the tabs 358 and have a circular shape the same as the load transfer pins 316.

The rod 352 is shaped to include a cooling air duct 362, outer pin receivers 364, and inner pin receivers 366 as shown in FIGS. 13 and 14. The cooling air duct 362 extends radially through the spar 312. The outer pin receivers 364 extend through the spar 312 at a radially outer end of the spar 312 and open into the air duct 362. The inner pin receivers 366 extend through the spar 312 at a radially inner end of the spar 312 and open into the air duct 362.

The load transfer pins 316 include outer mount pins 334 and inner mount pins 336 as shown in FIGS. 12-14. Each of the outer mount pins 334 extends away from the cap 350 of the spar 312, through the outer aperture 330 in the side wall of the outer vane mount 326 of the turbine vane 314, and into the rod 352 of the spar 312. The inner mount pin 336 that extends away from the cap 350 of the spar 312, through the inner aperture 332 in the side wall of the inner vane mount 228 of the turbine vane 314, and into the rod 352 of the spar 312.

The present disclosure teaches a turbine vane assembly 10, 210, 310 that manages the coefficient of thermal expansion mismatch between the metallic support structure 12, 212, 312 and the ceramic matrix composite vane 14, 214, 314. The turbine vane assembly 10, 210, 310 accounts for the relative thermal growth mismatch between the ceramic matrix composite vane 14, 214, 314 and the metallic support structure 12, 212, 312 through the application of compliance through appropriately shaped sliding features 16, 216, 316. In other ceramic matrix composite vane arrangements, this material mis-match is typically accounted for by using a spring or other compliant feature.

In the illustrative embodiments, the load from vanes 14, 214, 314 is transmitted outboard to the high-pressure turbine casing. In metallic embodiments, the turbine vane assembly structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the aerodynamic loading at both the inner and outer extents of the vane 14, 214, 314. The load may be transmitted from the vane 14, 214, 314 through a metallic structure or spar 12, 212, 312 out into the casing. However, the ceramic matrix composite material has a significantly lower coefficient of thermal expansion compared to the high temperature metals of the spar 12, 212, 312. Therefore, the components of the turbine vane assembly 10, 210, 310 has a significant mismatch in radial height between cold build and the hottest operating conditions.

In the illustrative embodiments, the turbine vane assembly 10, 210, 310 transfers the aerodynamic loading imparted on the ceramic matrix composite vane 14, 214, 314 through a series of load pins 16, 216, 316 arranged in apertures 30, 32, 230, 232, 330, 332. The apertures 30, 32, 230, 232, 330, 332 may be arranged on the suction surface of the vane 14, 214, 314 and may sit on either side of the resultant aerodynamic load vector. The locations of the apertures 30, 32, 230, 232, 330, 332 may be optimized to equally share loading at each aperture 30, 32, 230, 232, 330, 332.

The apertures 30, 32, 230, 232, 330, 332 may also be arranged on pressure side of the vane 14, 214, 314. The apertures 30, 32, 230, 232, 330, 332 on the pressure side prevents rotation of the vane 14, 214, 314 and maintains stability of the structure 12, 212, 312.

The location of the apertures 30, 32, 230, 232, 330, 332 may be chosen such that each aperture 30, 32, 230, 232, 330, 332 is always on the same side of the aerodynamic lift vector throughout the engine running range. In this way, there is no unloading or reversal of loading when the pressure distribution varies. Additionally, the distance from the vector to the apertures 30, 32, 230, 232, 330, 332 may be small, but measurable as the larger it is, the larger the moment becomes and therefore, the larger the stress in the ceramic matrix composite vane 14, 214, 314 and pin 16, 216, 316.

In the illustrative embodiments, three load transfer pins 16, 216, 316 are used at each radial end of the vane 14, 214, 314. In other embodiments, the vane assembly 10, 210, 310 may include more than three load pins 16, 216, 316, especially if three of the pins 16, 216, 316 are used to datum the ceramic matrix composite vane 14, 214, 314 relative to the support structure 12, 212, 312 and transfer loading. The remaining pins 16, 216, 316 may be used solely to transfer loading. The sole load transfer pins 16, 216, 316 may be undersized pins 16, 216, 316 that would engage upon loading, while the datum pins 16, 216, 316 engage on assembly.

In the illustrative embodiments, the load transfer pins 16, 216, 316 may comprise alumina or other non-metallic material. The pins 16, 216, 316 may provide a friendly ceramic matrix composite load transfer feature.

In the illustrative embodiments, the pins 16, 216,316 may also be hollow. The through holes 68, 268, 368 may be provided cooling flows to reduce the temperature of the contact between the pins 16, 216,316 and the vane 14, 214, 314.

Figure 2A:
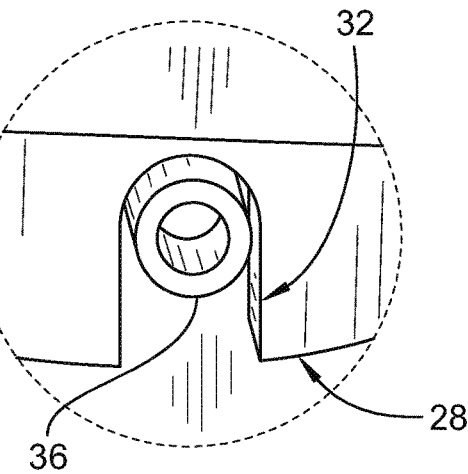
FIG. 2A is another detail view of the turbine vane assembly of FIG. 1 showing the inner vane mount of the turbine vane includes inner apertures provided by radially open-ended slots that allow radial movement of the corresponding inner mount pin extending into the inner aperture caused by the materials mismatch between the spar and the turbine vane.

The length and diameter of the features 16, 26, 316 may be optimized to balance the bending and shear stresses in the pin 16, 216, 316 and retaining feature 30, 32, 230, 232, 330, 332. The diameter may be minimized to reduce machining costs, but may achieve an acceptable load transfer per unit area. Compliance may be increased by increasing the size of the apertures 30, 32, 230, 323, 330, 332 relative to the pins 16, 216, 316 and/or reducing the stiffness of the pins 16, 216, 316 in a given orientation for example by slotting like as shown in FIGS. 2A and 7A.

In the illustrative embodiment of FIG. 1, the features 30 at the outer attachment 26 are circular to transfer axial, circumferential and radial loading. The features 32 at the inner attachment 28 are shaped to permit radial sliding. In some embodiments, the features 32 are oval like as shown in FIG. 2, and in other embodiments, the features 31 are slots like as shown in FIG. 2A.

In the illustrative embodiments, the pins may be mounted to a support structure 12 that partially surrounds the ceramic matrix composite vane 14 in the region of the load pins 16. The support structure 12 may mechanically connect to the high-pressure turbine casing. In some embodiments, the casing attachment may be a discrete carrier that contacts the vane 14. In other embodiments, alternative approaches to connecting the support structure 12 to the casing may be implemented.

In some embodiments, the blind features may be replaced with through-holes 30, 32, 230, 232, 330, 332, which may better tolerate the alpha mismatch between the ceramic matrix composite vane 14, 214, 314 and the metallic support structure 12, 212, 312, but may increase the machining costs. In some embodiments, the pins 16, 26, 316 may be installed after the spar 12, 212, 312 is positioned inside the ceramic matrix composite vane 14, 214, 314. Installing the pins 16, 216, 316 after the spar 12, 212, 312 is installed may simplify the arrangement as no metallic structure is needed at the outside perimeter of the ceramic matrix composite vane 14, 214, 314.

In other embodiments, the features 30, 32, 230, 232, 330, 332 may be machined on the inside of the vane 14, 214, 314. The pins may then be an integral part of the spar 12, 212, 312. Assembly of the turbine vane assembly 10, 210, 310 may be permitted by having the pins 34, 234, 334 at the periphery of the ceramic matrix composite feature 30, 230, 330 and then introducing one end set of pins 36, 236, 336 after the spar 12, 212, 312 is installed. Such an arrangement may transfer the loading through the edges of the pins 16, 216, 316, rather than the head.

In the illustrative embodiments, the load transfer pins 16, 216, 316 are round in shape. In other embodiments, a round load transfer pin 16, 216, 316 may not be the most appropriate shape because it would be prone to loading on a small portion of the circumference. In other embodiments, load transfer pins 16, 216, 316 may be profiled to maximize the contact with the side walls of the outer and inner vane mounts 26, 28, 226, 228, 326, 328. The shape and stiffness of the pins 16, 216, 316 may be optimized to maximize the load contact area on the ceramic matrix composite vane 14, 214, 314 to avoid point loading.

In some embodiments, the pins 16, 216, 316 may be simply supported between the spar 12, 212, 312 and a shroud support. This arrangement may reduce the stresses in the pins 16, 216, 316 and permit more flexibility for tailoring the compliance.

In some embodiments, the pins 16, 216, 316 may be hard mounted in the shroud, passing through the ceramic matrix composite vane 14, 214, 314 with a transition type fit (or with a defined clearance if a small rotation is permitted). The pins 16, 216, 316 may fit into recess features 64, 66, 264, 266, 364, 366 in the spar 12, 212, 312 with a defined fit e.g. interference/joint if equal load sharing is desired. In other embodiments, The pins 16, 216, 316 may fit into recess features 64, 66, 264, 266, 364, 366 in the spar 12, 212, 312 with a clearance if compliance is desired.

In some embodiments, a compliant layer may be added between the ceramic matrix composite vane 14, 214, 314 and metallic support structure 12, 212, 312. The compliant layer may help better spread the loads and help tolerate any tolerance stacking issues and/or the thermally induced relative movements.

As shown in the embodiments of FIGS. 6 and 12, the gap 270 between the collar 250, 350 and ceramic matrix composite vane 214, 314 may be tailored to minimize the secondary air leakage and vane/pin/support stress states. In the illustrative embodiment, the gap 270 is a nominal 2 mm gap, but in other embodiments, the gap 270 may be reduced to a very close (transition fit) at cold build.

Due to the alpha mismatch, the metallic structure 212, 312 will grow away from the ceramic matrix composite vane 214, 314. If the gap 270 is very small, the aerodynamic loads from the vane 214, 314 may be transmitted through the tabs 258, 358 rather than the pins 234, 334. Transferring the loads through the tabs 258, 358 may increase the contact area, reducing stresses, but may also change the load transfer from a determinant structure to indeterminate as the exact contact area would vary.

In other embodiments, rather than having discrete load transfer extensions 258, 358, the cap 250, 350 may extend around the entire CMC protrusion 226, 326 and may be extended to include the pins 216, 316. Such a cap 250, 350 may be a heavier solution, but the stiffness would be greater, reducing stresses.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the assembly comprising
    a metallic spar that extends radially inwardly relative to an associated turbine case arranged around a central reference axis, the metallic spar being configured to support other components of the turbine vane assembly relative to the associated turbine case, a turbine vane comprising ceramic matrix composite materials that is supported by the metallic spar, the turbine vane shaped to include an airfoil configured to direct the flow of hot gasses through a primary gas path of the turbine vane assembly, an outer vane mount arranged radially outward of the primary gas path, and an inner vane mount arranged radially inward of the primary gas path, wherein the turbine vane is shaped to define a passageway extending radially therethrough and the metallic spar extends from a radially-outer end of the turbine vane to a radially-inner end of the turbine vane, and load transfer pins that couple the turbine vane to the metallic spar, the load transfer pins including an outer mount pin that extends away from the metallic spar and through an outer aperture in the outer vane mount of the turbine vane and an inner mount pin that extends away from the metallic spar and through an inner aperture in the inner vane mount of the turbine vane, wherein the metallic spar defines a cooling air duct that extends radially through the turbine vane, and wherein at least one of the load transfer pins is hollow and provides fluid communication from outside the turbine vane into the cooling air duct of the metallic spar.

2. The assembly of claim 1, wherein one of the outer aperture and the inner aperture is sized to allow radial movement of the corresponding outer mount pin or inner mount pin to create a sliding support that transfers loading of the turbine vane to the metallic spar while accounting for different amounts of thermal growth due to material mismatch of the metallic spar and the turbine vane during operation of the turbine vane assembly at various temperatures and wherein the one of the outer aperture and the inner aperture sized to allow radial movement of the corresponding outer mount pin or inner mount pin has an enclosed oval shape to set limits on relative radial length change of the metallic spar relative to the turbine vane.

3. The assembly of claim 2, wherein the inner aperture is sized to allow radial movement of the corresponding inner mount pin and the outer aperture is sized to block radial movement of the corresponding outer mount pin so as to fix the turbine vane in place radially relative to the metallic spar at the outer mount pin.

4. The assembly of claim 2, wherein the turbine vane is shaped to further include an outer panel and an inner panel that each extend circumferentially from the airfoil away from the passageway through the turbine vane to define the primary gas path across the turbine vane assembly, the outer panel is arranged radially inward of the outer vane mount, and the inner panel is arranged radially outward of the inner vane mount.

5. The assembly of claim 2, wherein the one of the outer aperture and the inner aperture sized to allow radial movement of the corresponding outer mount pin or inner mount pin is provided by a radially open-ended slot.

6. The assembly of claim 5, wherein the inner aperture is sized to allow radial movement of the corresponding inner mount pin and the outer aperture is sized to block radial movement of the corresponding outer mount pin so as to fix the turbine vane in place radially relative to the metallic spar at the outer mount pin.

7. The assembly of claim 5, wherein the turbine vane is shaped to further include an outer panel and an inner panel that each extend circumferentially from the airfoil away from the passageway through the turbine vane to define the primary gas path across the turbine vane assembly, the outer panel is arranged radially inward of the outer vane mount, and the inner panel is arranged radially outward of the inner vane mount.

8. The assembly of claim 1, wherein the metallic spar includes a rod that extends radially through the passageway defined by the turbine vane and a cap shaped to define a cavity that receives one of the outer vane mount and the inner vane mount.

9. The assembly of claim 8, wherein at least one of the load transfer pins extends into the cap.

10. The assembly of claim 9, wherein the at least one of the load transfer pins extends from the cap, through a side wall of one of the outer vane mount and the inner vane mount, and into the rod of the metallic spar.

11. The assembly of claim 9, wherein the rod and the cap included in the metallic spar are formed from a single piece such that the metallic spar is a one-piece, integral component.

12. The assembly of claim 1, wherein the metallic spar defines a cooling air duct that extends radially through the turbine vane.

13. The assembly of claim 1, wherein the outer aperture in the outer vane mount of the turbine vane is circular in shape.

14. The assembly of claim 1, wherein the outer aperture is sized to block radial movement of the outer mount pin so as to fix the turbine vane in place radially relative to the metallic spar at the outer mount pin.

15. The assembly of claim 1, wherein the inner aperture is sized to allow radial movement of the inner mount pin.

16. A turbine vane assembly, the assembly comprising a metallic support structure adapted to be coupled to a turbine case that has a length that extends radially relative a central reference axis, a turbine vane comprising ceramic matrix composite materials shaped to include an airfoil that extends radially across a primary gas path of the turbine vane assembly, an outer vane mount arranged radially outward of the primary gas path, and an inner vane mount arranged radially inward of the primary gas path, and load transfer pins including (i) an outer pin that extends from the metallic support structure and into an outer aperture in the outer vane mount of the turbine vane and (ii) an inner mount pin that extends from the metallic support structure and into an inner aperture in the inner vane mount of the turbine vane, wherein one of the outer aperture and the inner aperture is sized to allow radial movement of the corresponding outer mount pin or inner mount pin to create a sliding support, wherein the metallic support structure defines a cooling air duct that extends radially through the turbine vane, and wherein at least one of the load transfer pins is hollow and provides fluid communication from outside the turbine vane into the cooling air duct of the metallic support structure.

17. The assembly of claim 16, wherein the turbine vane is shaped to further include an outer panel and an inner panel that each extend circumferentially from the airfoil away from the passageway through the turbine vane to define the primary gas path, the outer panel is arranged radially inward of the outer vane mount, and the inner panel is arranged radially outward of the inner vane mount.

18. The assembly of claim 17, wherein the turbine vane is a one-piece component and the airfoil, the outer vane mount, the inner vane mount, the outer panel, and the inner panel are integrated into a single piece of ceramic matrix composite material that has been co-infiltrated with ceramic matrix material.

19. A method comprising providing a metallic spar that extends relative to an axis, a turbine vane having an outer vane mount arranged at a radially outward end of the turbine vane and an inner vane mount arranged at a radially inward end of the turbine vane, and load transfer pins including an outer mount pin and an inner mount pin, locating the metallic spar in a passageway that extends radially through the turbine vane, inserting the outer load transfer pin through an outer aperture formed in the outer vane mount of the turbine vane and into the metallic spar, and inserting the inner load transfer pin through an inner aperture formed in the inner vane mount of the turbine vane and into the metallic spar, wherein one of the outer aperture and the inner aperture is a slot to allow radial movement of the corresponding outer mount pin or inner mount pin, wherein the metallic spar defines a cooling air duct that extends radially through the turbine vane, and wherein at least one of the load transfer pins is hollow and provides fluid communication from outside the turbine vane into the cooling air duct of the metallic spar.

* * * * *